United States Patent Office 3,536,769
Patented Oct. 27, 1970

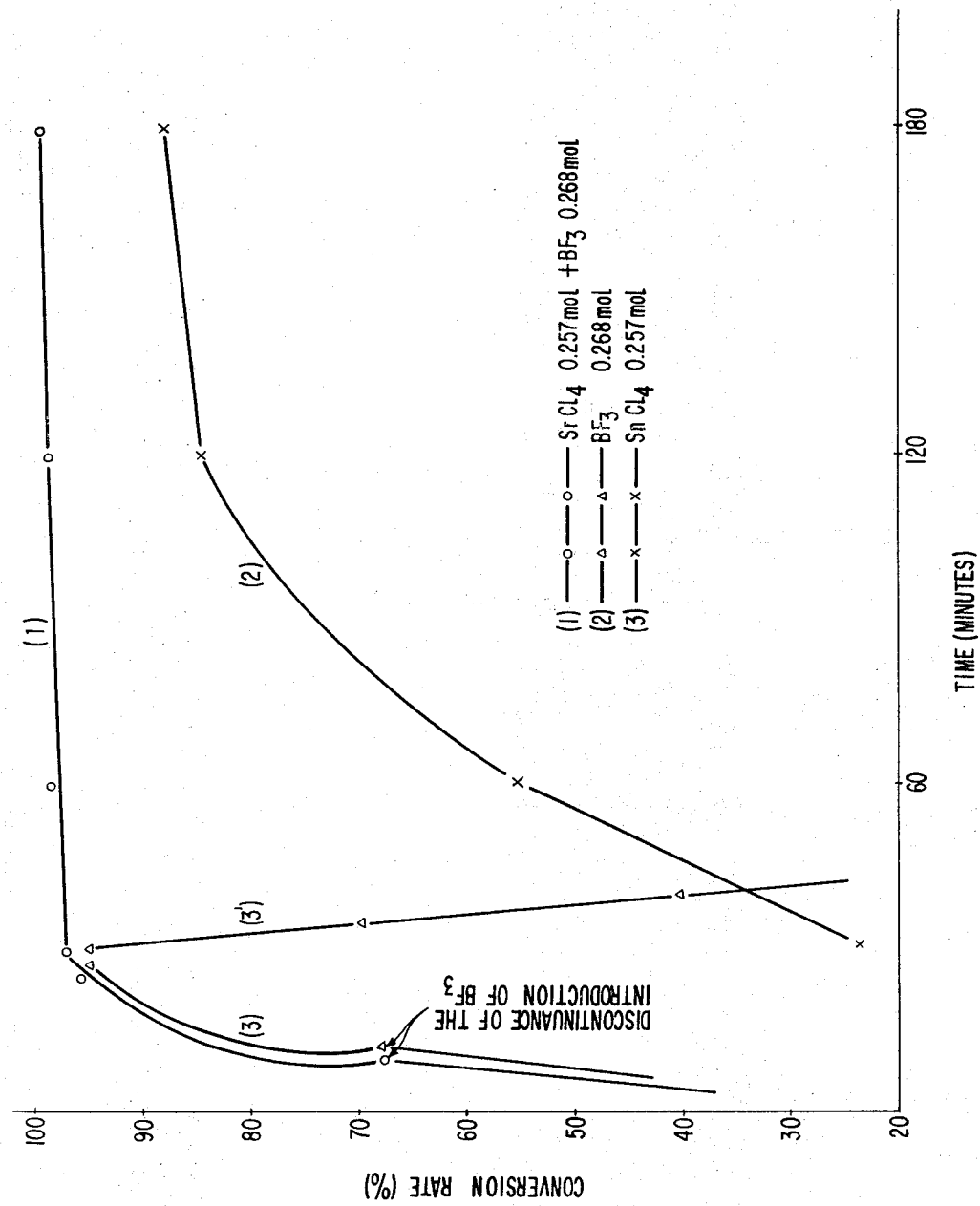

3,536,769
PROCESS FOR PREPARING ETHYLIDENE FLUORIDE
Shigeru Seki and Tadayoshi Watanabe, Fukushima, Japan, assignors to Kureha Kagaku Kogyo Kabushiki Kaisha, Tokyo, Japan
Filed Dec. 16, 1968, Ser. No. 783,884
Claims priority, application Japan, Dec. 14, 1967, 42/80,209
Int. Cl. C07c *17/08, 19/08*
U.S. Cl. 260—653.6      6 Claims

ABSTRACT OF THE DISCLOSURE

Ethylidene fluoride is prepared by reacting acetylene with anhydrous hydrogen fluoride using a cocatalyst comprising anhydrous tin tetrachloride and boron trifluoride.

BACKGROUND OF THE INVENTION

Field of the invention

The present invention relates to the manufacture of ethylidene fluoride.

Description of the prior art

In general, ethylidene fluoride is mixed with halofluoromethanes to be utilized as a refrigerant or a propellant and also is useful as an intermediate for manufacturing vinylidene fluoride and vinyl fluoride monomers.

Ethylidene fluoride has been industrially manufactured by adding hydrogen fluoride (HF) to acetylene. However, this addition reaction does not proceed in the absence of a catalyst. A number of catalysts for such an addition reaction have been researched. Typical of these catalysts are chemical materials as boron trifluoride ($BF_3$), tin tetrachloride anhydride ($SnCl_4$), fluorosulfonic acid, and various other metal oxides and chlorides.

Typical processes for manufacturing ethylidene fluoride using $BF_3$ as a catalyst have been described in U.S. Pats. No. 2,425,991; No. 2,762,849; and No. 3,190,930, etc. Though these processes have excellent characteristics such as a high conversion rate and good recycling capability these processes have the following defects for use as industrial manufacturing processes.

(1) As described in U.S. Pat. No. 2,762,849, 1.57 moles of $BF_3$ is required per 2.04 moles of HF. Since it has a very low boiling point ($-101°$ C.), it is thereby not retained in the reaction system, and, therefore, in a continuous reaction, $BF_3$ has to be continually added in large amounts or separated and recycled by expensive equipment. This is economically disadvantageous.

(2) In case the $BF_3$ concentration is decreased, or its catalytic action is reduced, vinyl fluoride is byproduced, which must be separated and purified.

(3) While $BF_3$ is highly active as a catalyst for an addition reaction, $BF_3$ accelerates the carbonization of acetylene, vinyl fluoride, and the like, and, therefore, not only does the reaction operation become difficult, but catalytic action is inhibited and catalytic life shortened.

An $SnCl_4$ catalyst, as described in U.S. Pat. No. 2,830,-099, has an excellent catalytic action in a liquid phase reaction, and does not hyproduce vinyl fluoride. Further, it is comparatively long in catalyst life (in comparison with $BF_3$) and is easy to use under reaction conditions. However, heretofore the catalyst life and catalytic activity of $SnCl_4$, which are industrially important, have not been sufficiently studied. The inventors have studied the life and activity of $SnCl_4$, and, as the result, the following defects have been found:

(1) $SnCl_4$ catalyst is very low in activation velocity and requires an induction time of 2 to 4 hours on a laboratory scale, and 5 to 8 hours on a larger scale. It has been found that when water is introduced into a $SnCl_4$ catalyst system with HF or acetylene, the activation velocity is rapid, and when the water content is poor, the velocity is slow. However, the presence of water reduces catalyst life, and it is not desirable to introduce water into the reaction system. Further, until the catalyst reaches an activated state, unreacted acetylene is present in comparatively large amounts and it is not easy to separate unreacted acetylene, ethylidene fluoride, and HF, and therefore, special expensive equipment is required.

(2) With an $SnCl_4$ catalyst, it is very difficult to separate a fresh catalyst and waste catalyst coexistent in the reaction phase and, therefore, it is difficult to continuously carry out the reaction by continuously supplying fresh catalyst and removing waste catalyst. Also, fluorosulfonic catalyst alone, if it is not used in large excess amounts, has a low conversion rate and has a very short catalyst life.

It has been known that to compensate these defects, chlorides of tin, titanium and antimony can be added as a co-catalyst to extend catalyst life. However, even by such means, vinyl fluoride is byproduced and catalyst life is not sufficient. Other metal oxides and chlorides have been studied for use as catalysts, however, these have been too low in selectivity for ethylidene fluoride, and not only by-produce vinyl fluoride but require high temperatures accompanied by disadvantages such as carbonization.

SUMMARY OF THE INVENTION

Preparing ethylidene fluoride by reacting anhydrous hydrogen fluoride with acetylene in the presence of a cocatalyst consisting of anhydrous tin tetrachloride and boron trifluoride. Reaction is preferably in the liquid phase, and the cocatalyst preferably comprises from about $1/10,000$ mol to one equivalent mol of $BF_3$ per mole of anhydrous tin tetrachloride.

The present invention offers a very high conversion rate to ethylidene fluoride, and an activation velocity and co-catalyst life which are remarkably improved over the same parameters in the prior art processes.

BRIEF DESCRIPTION OF THE DRAWINGS

The drawing is a graph of the relationship between conversion rate and reaction time in the production of ethylidene fluoride, showing the effectiveness of the catalyst of the present invention.

DETAILED DESCRIPTION OF THE PREFERRED EMBODIMENTS

The present inventors have studied the activation mechanism of the $SnCl_4$ catalyst and, during study, the present inventors have found that $SnCl_4$ catalyst in combination with $BF_3$ (generally in less than equimolar quantities) surprisingly exhibit an excellent cocatalytic effect, which the catalysts do not individually posses, the conversion rate to ethylidene fluoride, activation velocity and cocatalyst life being remarkably improved by means of the cocatalyst of the present invention.

The present invention relates to a process for producing ethylidene fluoride in a good yield per unit catalyst by passing acetylene continuously with hydrogen fluoride anhydride (HF) in contact with a catalytic mixture of tin tetrachloride anhydride ($SnCl_4$) and boron trifluoride ($BF_3$) while maintaining the whole in a liquid state.

Objects of the present invention are to increase the activation velocity of a cocatalyst for the above addition reaction, to elevate the conversion rate to ethylidene fluoride, to extend cocatalyst life and finally to improve yields in a process for manufacturing ethylidene fluoride.

25 moles of HF and 0.257 mole of $SnCl_4$ were placed in a 700 ml. reaction vessel made of polytrifluoro monochloro ethylene, and, while maintaining in the liquid phase at a temperature of 10° C., 0.268 moles of $BF_3$ and 0.5 mole per hour of acetylene were simultaneously introduced thereinto and the reaction was carried out in the nonagitated state. The conversion rate of acetylene to ethylidene fluoride reached 97.5% 20 minutes after the reaction was commenced, and elevated to 99.9% after 2 hours.

When $SnCl_4$ catalyst alone was employed, the conversion rate was only about 10% after 20 minutes, 3 hours or more were required until the conversion rate reached maximum, and the maximum yield was also low.

$BF_3$ alone was then used, 0.268 mole of $BF_3$ being introduced as above. After 10 minutes, the initial conversion rate reached 97% 20 minutes after reaction was initiated. However, the conversion rate rapidly reduced within 30 minutes after the addition of $BF_3$ was discontinued. This relationship is shown in the drawing. The drawing shows (1) the conversion rate at each reaction time when employing 0.257 mole of $SnCl_4$ and 0.268 mole of $BF_3$; (2) the same for using 0.257 mole of $SnCl_4$ only; and (3) the same for using 0.268 mole of $BF_3$ alone; (4) the state in which the conversion rate is reduced after the introduction of $BF_3$ is discontinued in (3).

If the effect of a cocatalyst of $SnCl_4$ and $BF_3$ was only the sum of the effects of each individual catalyst, there should be a "valley" in the conversion rate somewhere between 30 minutes to 3 hours. However, in the cocatalyst the formation of such a valley was not seen. From this fact, a synergistic action of the cocatalyst is clearly recognized.

Thus, the cocatalyst has been found to have excellent activation velocity and conversion rate, which are, however, varied remarkably depending upon the method of use. To illustrate this variance, the 5.0 moles of HF and 0.035 mole of $SnCl_4$ were added to the reaction vessel and, while maintaining the liquid phase at a temperature of 10° C., 0.015 mole of $BF_3$ was introduced for 10 minutes and thereafter 0.5 mole per hour of acetylene was passed into the liquid. The conversion rate was about 78% after 20 minutes. Under the same conditions, the same amounts of $BF_3$ and acetylene were introduced simultaneously under stirring. After 20 minutes, the conversion rate reached 92%. $BF_3$ was more effective when simultaneously introduced with acetylene into HF and $SnCl_4$. The effect of the amount of $BF_3$ to $SnCl_4$ to be used was studied in detail and the following conclusions were reached:

Two factors (activation velocity and cocatalyst life) were researched in the range 0.0005 to 0.75 mole of $BF_3$ to 7.5 moles of HF and 0.035 mole of $SnCl_4$. As the result, it has been found that the activation state reaches a peak in 20 minutes, even when employing 0.0005 mole of $BF_3$. Alternatively, the life of the cocatalyst shows a maximum value when 0.015 mole of $BF_3$, that is, a half molar amount of $SnCl_4$ was used. Therefore, the amount of $BF_3$ used is desirably from about 1 equivalent mole to $\frac{1}{10,000}$ mole of $SnCl_4$ and, in particular most preferably about ½ mole of $SnCl_4$.

Further, the amount of catalyst used is desirably 0.01–1.5 moles as $SnCl_4$ for HF. In case the amount of catalyst is too low, the catalyst tends to rapidly lose its activity due to water introduced into the reaction system. In case the amount is too high, the catalyst will not completely dissolve in HF.

The catalyst need not necessarily be added initially, but can be added during reaction before activity is lost. Therefore, the lower limit of the above mentioned catalyst does not always mean the initial amount, but may be considered as the amount of catalyst added during reaction.

The form in which the active cocatalyst of the present invention functions has not yet been confirmed. However, in view of the fact that $SnCl_4$ and $BF_3$, $SnCl_4$ and HF, and $BF_3$ and HF are known to produce a complex compound therebetween, and that $BF_3$ shows a maximum yield at ½ mole of $SnCl_4$, a complex compound consisting of 1 mole of $SnCl_4$ and ½ mole each of $BF_3$ and HF may be considered to constitute this active cocatalyst.

In order to increase the activation velocity and to improve the yield, stirring is desirable. However, the cocatalyst is effective in the nonagitated state. Reaction temperature is correlated with the pressure in the reaction system (which it is necessary to maintain in the liquid phase). At a temperature of from −20° to 60° in the pressure system, experiments were carried out. It was found that a temperature of from 10 to 15° C. is industrially desirable. However, it will be understood that the present invention is not to be limited strictly in temperature and pressure.

EXAMPLE 1

A 700 ml. reaction vessel made of poly(trifluoromono chloroethylene) was cooled to −30° C. by using methanol, air in the vessel was expelled with dried helium and 25 moles of HF and 0.257 mole of $SnCl_4$ were added thereto. The methanol was gradually heated and the temperature of liquid in the reaction vessel was maintained at 13° C. Then, 0.268 mole of $BF_3$ and 0.7 mole per hour of acetylene were simultaneously introduced therein and the reacton was carried out in the non-stirring state. The liquid level in the reaction vessel was maintained constant by adding HF.

The reaction gas was passed through a condenser 3 cm. in diameter and 1 m. in length cooled to −20° C. HF was liquefied and returned to the reaction vessel and the product from the condenser was washed with 20% caustic soda, measured by a wet gas flow meter, and subsequently passed through a calcium chloride tube. After drying, the following results were determined by a gas chromatographic analysis:

| Catalyst | Conversion rate to $CH_3CHF_2$ percent after— | | | | | Yield of $CH_3 CH_2$ percent |
|---|---|---|---|---|---|---|
| | 0.5 | 1.0 | 2.0 | 3.0 | 4.0 | |
| $SnCl_4$, plus $BF_3$, 0.257 moles plus 0.268 moles | 97.0 | 98.5 | 99.2 | 99.9 | 99.9 | 97.0 |
| $SnCl_4$, 0.257 moles | 23.0 | 55.0 | 85.0 | 88.5 | 90.3 | 65.0 |

EXAMPLE 2

A procedure as in Example 1, using a 200 ml. reaction vessel made of poly(trifluoromono chloroethylene) and charging thereinto 5.0 moles of HF and 0.035 mole of $SnCl_4$ was utilized. 0.015 mole of $BF_3$ and 0.5 mole per hour of acetylene were simultaneously introduced, and the reaction was carried out at 10° C. After the same treatment as in Example 1, the following results were noted:

| Method of introducing $BF_3$ | Conversion rate to $CH_3 CHF_2$ percent after—minutes | | | | | |
|---|---|---|---|---|---|---|
| | 15 | 30 | 45 | 60 | 90 | 120 |
| Together with acetylene | 91.0 | 92.5 | 93.5 | 95.0 | 96.0 | 96.0 |
| After introducing $BF_3$, acetylene was introduced | 74.5 | 81.5 | 83.0 | 87.0 | 89.5 | 91.0 |

EXAMPLE 3

Using the same apparatus as in Example 2, 7.5 moles of HF and 0.035 mole of $SnCl_4$ were charged therein and from 0.0005 to 0.75 mole of $BF_3$ and 1.0 mole per hour of acetylene were introduced therein at 10° C. to carry out the reaction. The product was treated as in the above examples. The activation velocity and the life of the cocatalyst were as follows:

| Catalyst (moles) | | Conversion rate to $CH_3CHF_2$ percent after—hours | | | | Life of catalyst |
|---|---|---|---|---|---|---|
| $SnCl_4$ | $BF_3$ | 0.5 | 1.0 | 1.5 | 20 | |
| 0.035 | 0 | 59.0 | 80.0 | 86.0 | 89.0 | 7.50 |
| 0.035 | 0.0005 | 83.0 | 88.0 | 90.0 | 92.0 | 7.75 |
| 0.035 | 0.0075 | 81.0 | 86.0 | 88.0 | 89.0 | 8.25 |
| 0.035 | 0.0150 | 84.0 | 87.0 | 90.0 | 92.5 | 10.50 |
| 0.035 | 0.0350 | 83.0 | 87.5 | 90.0 | 92.5 | 8.50 |
| 0.035 | 0.075 | 89.0 | 89.5 | 89.0 | 90.0 | 6.50 |
| 0.035 | 0.225 | 84.5 | 89.0 | 90.0 | 91.5 | 6.00 |
| 0.035 | 0.75 | 83.5 | 89.5 | 90.0 | 92.0 | 5.75 |

As a general rule, the ratio of HF to acetylene is not important in the practice of the present invention.

What is claimed is:

1. A process for preparing ethylidene fluoride which comprises reacting anhydrous hydrogen fluoride with acetylene in the liquid phase at a temperature within the range of from minus 20° C. to 60° C. in the presence of a cocatalyst consisting of anhydrous tin tetrachloride and boron trifluoride.

2. A process as set forth in claim 1, wherein boron trifluoride is present in an amount of from $1/10,000$ mole to an equivalent mole of $BF_3$ per mole of anhydrous tin tetrachloride.

3. A process as in claim 1 wherein said $BF_3$ is added simultaneously with the said acetylene into said HF and said anhydrous tin tetrachloride.

4. A process as in claim 1 wherein from about 0.01 to about 1.5 moles of anhydrous tin chloride is present per mole of HF, and from about $1/10,000$ mole to about 1 equivalent mole of said $BF_3$ is present per mole of anhydrous tin tetrachloride.

5. A process as in claim 1 wherein the molar ratio of anhydrous tin tetrachloride to $BF_3$ to HF is from about 1: to about ½: to about ½:, respectively.

6. A process as in claim 1 wherein said reaction is conducted at a temperature of from about 10 to about 15° C.

References Cited

UNITED STATES PATENTS 2,425,991 8/1947 Burk et al. _____ 260—653.6
2,830,099 4/1958 Swamer _____ 260—653.6

DANIEL D. HORWITZ, Primary Examiner

U.S. Cl. X.R.

252—433